(12) United States Patent
Hanashima et al.

(10) Patent No.: US 6,845,196 B2
(45) Date of Patent: Jan. 18, 2005

(54) OPTICAL BRANCHING DEVICE

(75) Inventors: Naoki Hanashima, Tokyo (JP); Tohru Kineri, Tokyo (JP)

(73) Assignee: TDK Corporation, Tokyo (JP)

( * ) Notice: Subject to any disclaimer, the term of this patent is extended or adjusted under 35 U.S.C. 154(b) by 59 days.

(21) Appl. No.: 10/401,566

(22) Filed: Mar. 31, 2003

(65) Prior Publication Data

US 2004/0047562 A1 Mar. 11, 2004

(30) Foreign Application Priority Data

Apr. 1, 2002 (JP) ........................................ 2002-098266

(51) Int. Cl.[7] .................................................. G02B 6/26
(52) U.S. Cl. ........................................ 385/45; 385/43
(58) Field of Search ............................. 385/28, 31, 39, 385/43, 45, 50

(56) References Cited

U.S. PATENT DOCUMENTS

| | | | |
|---|---|---|---|
| 5,289,551 A | * | 2/1994 | Nakama et al. ................ 385/45 |
| 5,586,209 A | | 12/1996 | Matsuura et al. |
| 5,590,226 A | | 12/1996 | Wolf et al. |
| 5,627,928 A | | 5/1997 | Matsuura et al. |
| 5,745,619 A | | 4/1998 | Li et al. |
| 2003/0133662 A1 | * | 7/2003 | Kim et al. ..................... 385/43 |

FOREIGN PATENT DOCUMENTS

| | | |
|---|---|---|
| JP | A 62-247305 | 10/1987 |
| JP | A 6-289242 | 10/1994 |
| JP | A 8-292340 | 11/1996 |
| JP | A 9-15436 | 1/1997 |
| JP | A 2000-66045 | 3/2000 |
| JP | A 2001-235645 | 8/2001 |

OTHER PUBLICATIONS

Soldano et al., "Optical Multi–Mode Interference Devices Based on Self–Imaging: Principles and Applications", Journal of Lightwave Technology, vol. 13, No. 4, 1995, pp. 615–627.

Hida et al., "Properties of tandem–aligned silica–based Y–branch optical waveguides", Proceedings of Japanese Society of Applied Physics Annual Conference, 10p–ZN–16, 1991.

* cited by examiner

Primary Examiner—John D. Lee
Assistant Examiner—Sarah Song
(74) Attorney, Agent, or Firm—Oliff & Berridge, PLC

(57) ABSTRACT

The optical branching device includes an input optical waveguide for outputting light inputted from a light input end face to a light output end face, a tapered optical waveguide having one end face connected to the light output end face and a width expanding at a predetermined angle, and branching optical waveguides connected to the other end face of the tapered optical waveguide at a predetermined branching angle, in which when a propagation constant of a leaky mode is $\beta_L$, a propagation constant of a fundamental mode is $\beta_0$, a meander period is $\Lambda$, and $\Lambda=2\pi/(\beta_0-\beta_L)$, an optical waveguide length L from a position which becomes a cause of the leaky mode to the light output end face is substantially integer times $\Lambda/2$.

16 Claims, 4 Drawing Sheets

OPTICAL BRANCHING DEVICE

BACKGROUND OF THE INVENTION

1. Field of the Invention

The present invention relates to an optical branching device connected to a light output end face of an optical waveguide device or another optical branching device for branching input light.

2. Description of the Related Art

A general optical branching device is comprised of an input optical waveguide, a taper-shaped transition region for adiabatically changing a light distribution, and respective branching optical waveguides.

Although the optical branching device is designed so that optical powers propagated to the respective branching optical waveguides have desired values, a measured value of a branching characteristic of a fabricated optical branching device often becomes a value different from a calculated value of the branching characteristic. In an actual optical branching device, a light output end face of an optical fiber is connected to a light input end face of an input optical waveguide, however, while a section of the optical fiber orthogonal to its axis is circular, a section of the optical waveguide orthogonal to its axis is rectangular, and therefore, both have different eigen modes. Accordingly, in the connection structure of the input optical waveguide and the optical fiber, it is impossible to avoid the occurrence of a leaky mode caused by mismatching of mode solution distributions of those.

Since the magnitude of the occurring leaky mode also includes a previously expected coupling loss and a coupling loss which can occur by fiber connection or the like, it is very difficult to prepare an optimum design in view of the actual leaky mode. Accordingly, in order to suppress branching ratio variation of the optical branching device caused by a subtle difference of a connection state between the optical fiber and the input optical waveguide, very accurate optical axis alignment is required at the time of connection of the optical fiber and the input optical waveguide. Thus, there arises a problem that the connection operation of the optical fiber and the input optical waveguide becomes troublesome and yield becomes low.

SUMMARY OF THE INVENTION

An object of the invention is to provide an optical branching device in which optical axis alignment is easy and the lowering of yield is suppressed.

The above object is achieved by an optical branching device which comprises an input optical waveguide for outputting light inputted from a light input end face to a light output end face, a tapered optical waveguide having a tapered part and one end face connected to the light output end face, and branching optical waveguides connected to the other end face of the tapered optical waveguide at a predetermined branching angle, and is characterized in that when a propagation constant of a leaky mode is $\beta_L$, a propagation constant of a fundamental mode is $\beta_0$, a meander period is $\Lambda$, and $\Lambda = 2\pi/(\beta_0 - \beta_L)$, an optical waveguide length from a position which becomes a cause of occurrence of the leaky mode to the light output end face is substantially integer times as $\Lambda/2$.

The optical branching device of the invention is characterized in that the optical waveguide length is integer times as $\Lambda/2 \pm 10\%$ of $\Lambda/2$.

The optical branching device of the invention is characterized in that the position which becomes the cause of the occurrence of the leaky mode is in a vicinity of the light input end face. The optical branching device is characterized in that the light input end face is connected with a light output end face of an optical fiber.

The optical branching device of the invention is characterized in that the position which becomes the cause of the occurrence of the leaky mode is a waveguide device or another optical branching device provided at a front stage of the input optical waveguide.

The optical branching device of the invention is characterized in that the input optical waveguide is formed to be linear.

DETAILED DESCRIPTION OF THE PREFERRED EMBODIMENTS

Figure 1:
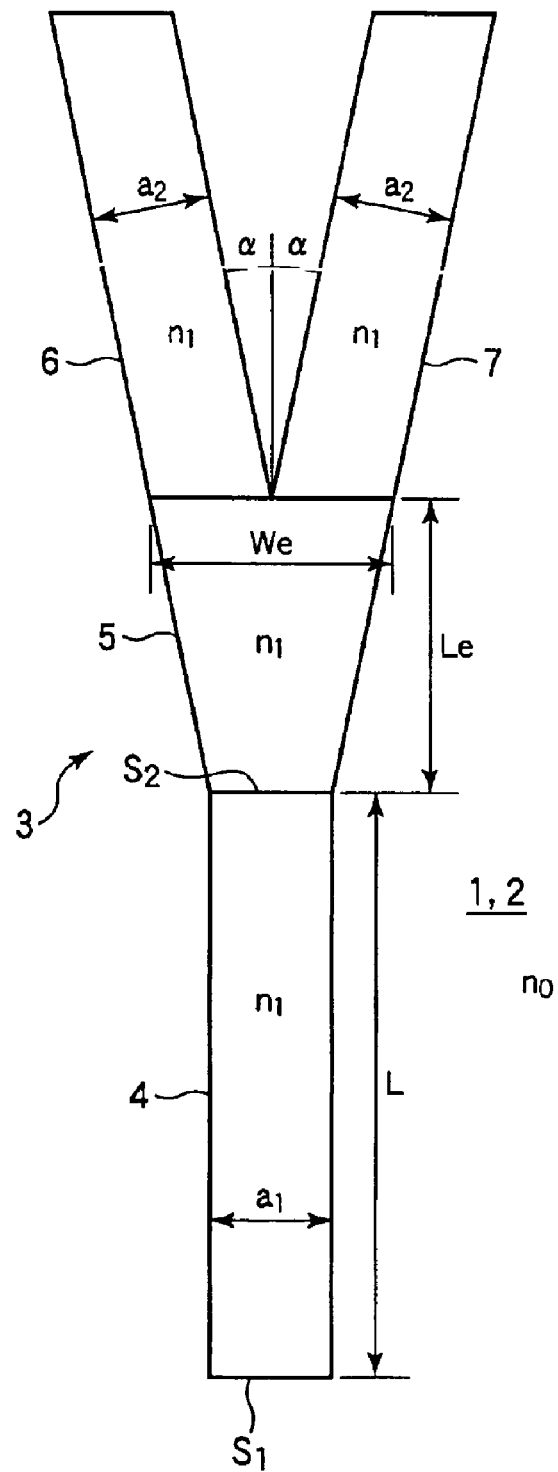
FIG. 1 shows a state in which a silica glass substrate 1 on which an optical branching device according to an embodiment of the invention is formed is seen in the direction of the normal to a substrate plane.

An optical branching device according to an embodiment of the invention will be described with reference to FIGS. 1 to 4. First, a rough structure of the optical branching device of the embodiment will be described with reference to FIG. 1. FIG. 1 shows a state in which a silica glass substrate 1 on which the optical branching device is formed is seen in the direction of the normal to a substrate plane. The optical branching device shown in FIG. 1 comprises a clad layer 2 formed on the silica glass substrate 1 and having a refractive index $n_0$. A core 3 having a refractive index $n_1$ larger than the refractive index $n_0$ of the clad layer 2 is embedded in the clad layer 2.

The core 3 is comprised of a linear input optical waveguide 4, a tapered optical waveguide 5 as a transition region in which a light distribution is adiabatically changed, and respective branching optical waveguides 6 and 7. The core 3 is certainly embedded in the clad layer 2.

In the linearly extending input optical waveguide 4 having an optical waveguide length L and a width $a_1$, a light input end face $S_1$ is connected to a light outgoing end face of a not-shown optical fiber, and a light output end face $S_2$ is connected to one end face of the tapered optical waveguide 5. The tapered optical waveguide 5 comprises a tapered part in which a side wall is, for example, linearly expanded at a predetermined angle toward the other end face. A width We of the other end face of the tapered optical waveguide 5 is wider than the width $a_1$, and a length Le of the tapered optical waveguide 5 is determined on the basis of the width $a_1$, the width We and a branching angle $\alpha$.

The branching optical waveguides 6 and 7 are disposed to be symmetrical at both sides of the center of the other end face of the tapered optical waveguide 5 at the branching angle $\alpha$. Each of the branching optical waveguides 6 and 7 has the same width $a_2$.

Next, a manufacturing method of the optical branching device of this embodiment will be described in brief. For example, in the case of a silica glass optical waveguide, a lower clad layer is formed on the silica glass substrate 1. Next, a film of a core formation material is formed and patterning is made to form the core 3. Next, an upper clad layer is formed to completely embed the core 3 in a clad formation material, and then, an annealing treatment is performed and the optical branching device is completed. As a film formation method of the clad layer 2 and the core formation material, a flame hydrolysis deposition method, sputtering, evaporation, various CVD methods, sol-gel method or the like can be used. Besides, for adjustment of a refractive index and a film stress, Ge (germanium), P (phosphorous), B (boron), Ti (titanium), F (fluorine) or the like may be naturally added. Besides, instead of the silica glass substrate, a Si (silicon) substrate can also be used. Incidentally, the structure of the optical branching device according to this embodiment can also be applied to a waveguide of ion diffusion into an optical crystal such as lithium niobate or a glass substrate, a rib waveguide, a waveguide formed on a semiconductor substrate, or the like.

Next, a method of obtaining the optical branching device with smaller branching ratio variation by optimizing the length L of the input optical waveguide 4 will be described.

In general, the calculation of an optical waveguide propagation characteristic is made by a method called BPM (beam propagation method). In the BPM, a complex amplitude (amplitude and phase) of a light electric field changing with propagation is obtained in coordinates discretized along the propagation direction of light by substituting a complex amplitude at a position immediately before a position where the complex amplitude is to be obtained and a refractive index distribution into an approximated Helmholtz equation.

By giving an initial excitation condition at the light input end face $S_1$ of the input optical waveguide 4 by an eigen mode solution separately calculated from the sectional structure of the input optical waveguide 4, an influence on a propagation characteristic by only the structure of the optical waveguide can be calculated. However, in an actual device, a light outgoing end face (not shown) of an optical fiber is connected to the light input end face $S_1$ of the input optical waveguide 4. As described above, since the optical fiber has the circular section orthogonal to its axis, it has an eigen mode different from the input optical waveguide 4 having the rectangular section orthogonal to its axis. Accordingly, in the connection structure of the input optical waveguide 4 and the optical fiber, it is impossible to avoid a coupling loss caused by the mismatching of mode solution distributions of those. Although this mismatching loss can be easily decreased by optimizing the shape of the rectangular optical waveguide, since the optimized optical waveguide structure has a large minimum bend radius, there arises a problem that the scale of the device itself is increased.

As stated above, the lowering of the mismatching loss and the decrease of the device scale are in a trade-off relation, and in an actual device, balanced optimization in view of this point is required to be performed, and for that purpose, there is a case where the increase of the coupling loss to such a degree that a problem does not arise must be allowed.

Here, although "loss light" generated by the mismatching of the eigen mode field distributions is propagated as a leaky mode in the clad layer 2, since these are not a waveguide mode, while being propagated in the clad layer 2 in the vicinity of the input optical waveguide 4, the light is diffracted and is attenuated. To allow the increase of the coupling loss is to allow the existence of this leaky mode, and an analysis including the existence of the leaky mode becomes necessary for optimizing the optical branching device.

Although the "leaky light" of the leaky mode is apt to attenuate as compared with the waveguide mode, in the case where the refractive index distribution is changed and the state of the propagation mode is changed in a region where it does not sufficiently attenuate, there is a case where part of the leaky light is recombined with the propagation mode, or interference occurs between the leaky mode and the propagation mode. Particularly, in the structure in which the branching structure is disposed at the light output end face of the linearly extending input optical waveguide 4 as in the optical branching device, there is a case where the branching characteristic is remarkably influenced by the light recombination or the interference. This is the reason why the calculation result of the branching characteristic by the BPM is different from the actual measured value, and in order to make the branching characteristic coincident with the designed value and to obtain sufficient manufacture reproducibility, it is necessary to remove the influence of this leaky light by a suitable method.

Figure 2:
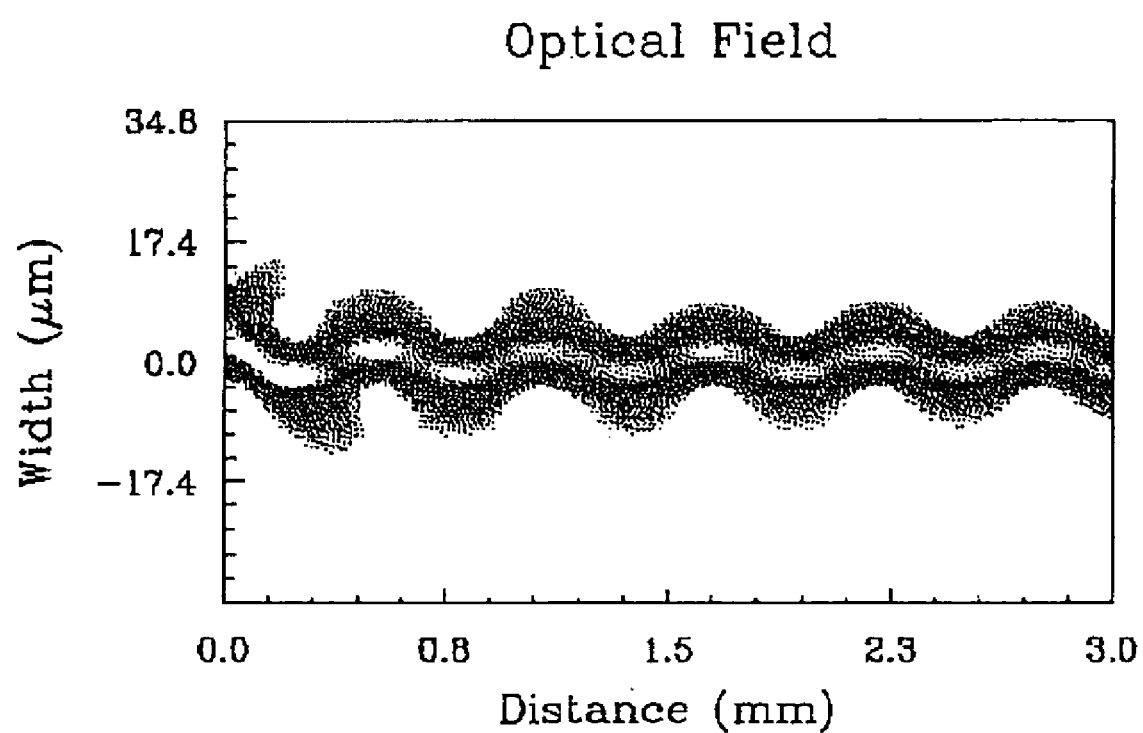
FIG. 2 shows an influence of leaky light.

FIG. 2 shows an example of the influence of the leaky light. In FIG. 2, the horizontal axis indicates a distance (mm) from the light input end face $S_1$ of the input optical waveguide 4, and the vertical axis indicates a meander width (μm) of guided light. FIG. 2 shows results in which with respect to the simple linear input optical waveguide 4, an intentionally large leaky mode (that is, coupling loss) is made to occur as an input excitation condition at the light input end face $S_1$ of the left end in the drawing, and the distribution of light electric field intensity along the propagation direction is calculated by the BPM. The meander of the light intensity along the optical waveguide direction is due to the interference between the leaky mode and the propagation mode, and this is the essential cause of deterioration of the branching characteristic in the optical branching device.

As disclosed in reference 1: 'L B Soldano, "Optical Multi-mode interference devices based on self-imaging", J. Lightwave Tech., Vol. 13, No. 4, 1995' in general, interference between modes is a state where the respective modes coexist and are propagated, and when this mode interference exists, since the respective propagation constants subtly vary, a "beat" is generated in the electric field amplitude of the propagated light. This "beat" appears as the meander phenomenon as shown in FIG. 2. Accordingly, in the optical branching device in which the end face of the tapered optical waveguide 5 is connected to the light output end face $S_2$ of the input optical waveguide 4, there occurs a case where in depending on the optical waveguide length L of the linear input optical waveguide 4, the electric field distribution to be originally symmetrical with respect to the center axis of the optical waveguide becomes asymmetrical at the light input end face of the tapered optical waveguide 5, and the branching ratio is deteriorated by this.

As a reference on the deterioration of the branching ratio, there is '"Properties of tandem-aligned silica-based Y-branch optical waveguides", Proceedings of Japanese Society of Applied Physics Annual Conference, 10p-ZN-16, 1991'(reference 2) by Hida et al. The reference discloses that leaky light generated in a branching part meanders along a waveguide and is propagated to deteriorate a branching characteristic.

The method of obtaining the optical branching device with less branching ratio variation according to this embodiment is different from the reference 2 in that not only deterioration of the branching characteristic of a tandem stage by a front stage optical branching device is avoided, but also deterioration of the branching characteristic of an optical branching device initial stage is suppressed. Besides, in the optical branching device of the tandem stage, since the distance relation with respect to the front stage optical branching device is uniquely determined by a pattern drawn on an exposure mask at a photolithography step, when a previously optimized arrangement pattern is adopted, there does not arise a problem of manufacture variation or the like.

On the other hand, in this embodiment, a study is carried out on a problem which can occur in a system including not only an optical branching device but also an input/output optical fiber. Since the magnitude of the leaky mode includes the previously expected coupling loss and the coupling loss which can occur in the optical fiber connection or the like, it is very difficult to prepare an optimum design in view of the actual leaky mode. If the optimum design is not performed, the branching ratio of the optical branching device varies by a subtle difference of the optical fiber connection state, and the lowering of yield is caused, and further, the troublesome of light axis alignment is also caused.

Figure 3A:
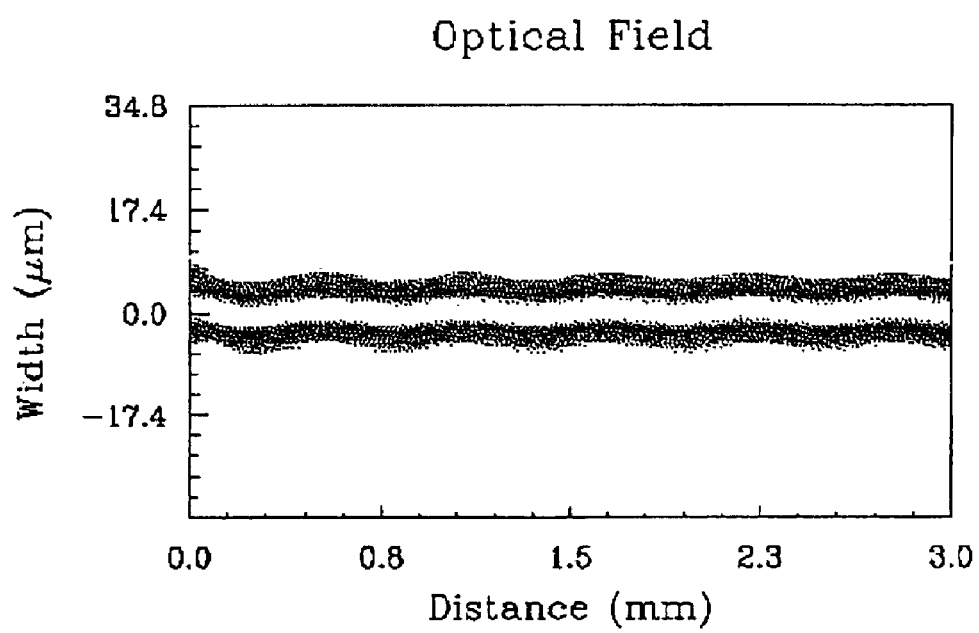
FIGS. 3A and 3B show a change of meander curved lines due to the magnitude of a leaky mode.
Figure 3B:
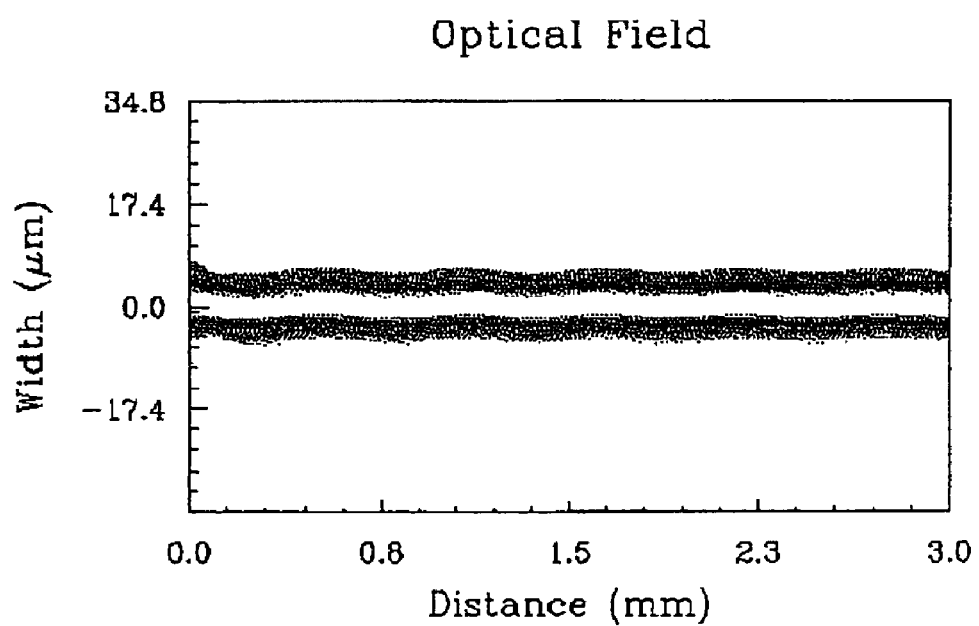

As described above, the interference between the leaky mode and the propagation mode generates the "beat" and this "beat" causes the branching ratio to change. FIGS. 3A and 3b show calculation results of meander curbed lines in the case where the magnitude of the leaky mode is intentionally changed with respect to the same linear optical waveguide. FIG. 3A shows the meander curved line in the case where the leaky mode is relatively large. FIG. 3B shows the meander curved line in the case where the leaky mode is relatively small. In both of the drawings, the horizontal axis indicates a distance (mm) from the light input end face $S_1$ of the input optical waveguide 4, and the vertical axis indicates a meander width ($\mu$m) of guided light.

The magnitude of the leaky mode was controlled while a Gaussian function in which the center of the leaky mode was made offset with respect to the center axis of the input optical waveguide 4 was made an input excitation function. From FIGS. 3A and 3B, it is understood that the period of the meander is not changed, and the position of a "node" does not depend on the input excitation function.

The meander period $\Lambda$ is expressed using the propagation constant $\beta_L$ of the leaky mode and the propagation constant $\beta_0$ of the fundamental mode as follows:

$$\Lambda = 2\pi/(\beta_0 - \beta_L) \quad \text{(equation 1)}$$

When the wavelength of light is $\lambda$, and the refractive index of the clad layer 2 is $n_{clad}$, the propagation constant of the leaky mode is expressed as follows:

$$\beta_L = (2\pi/\lambda) \cdot n_{clad} \quad \text{(equation 2)}$$

An effective refractive index $n_{eff0}$ of a normal mode is obtained from a eigenvalue equation of an optical waveguide.

If the position of the "node" is disposed at the light output end face $S_2$ of the input optical waveguide 4 connected to the light input end face of the tapered optical waveguide 5, the electric field amplitude distribution of light becomes symmetrical with respect to the center axis of the optical waveguide, and becomes constant irrespective of the magnitude of the leaky light. Since the period of the "node" is expressed by $\Lambda/2$, the length of the input optical waveguide 4 (optical waveguide length L) is made integer times as $\Lambda/2$, so that the branching ratio variation can be lowered.

As stated above, according to this embodiment, the excellent optical branching device with less branching ratio variation can be obtained.

EXAMPLE

Next, a concrete example will be described. When a specific refractive index difference $\Delta n$ is made $\Delta n = 0.4\%$, a core dimension in which a single mode occurs is 7.5 ($\mu$m)×7.5 ($\mu$m). As the structure of the optical branching device, the width of the incident optical waveguide 4 is $a_1 = 7.5\ \mu$m, the length of the tapered optical waveguide 5 is Le=180 $\mu$m, and the width of the end face is We=15 $\mu$m. The width of each of the branching optical waveguides 6 and 7 is $a_2 = 7.5\ \mu$m, and the branching angle is $\alpha = 0.4°$.

Figure 4:
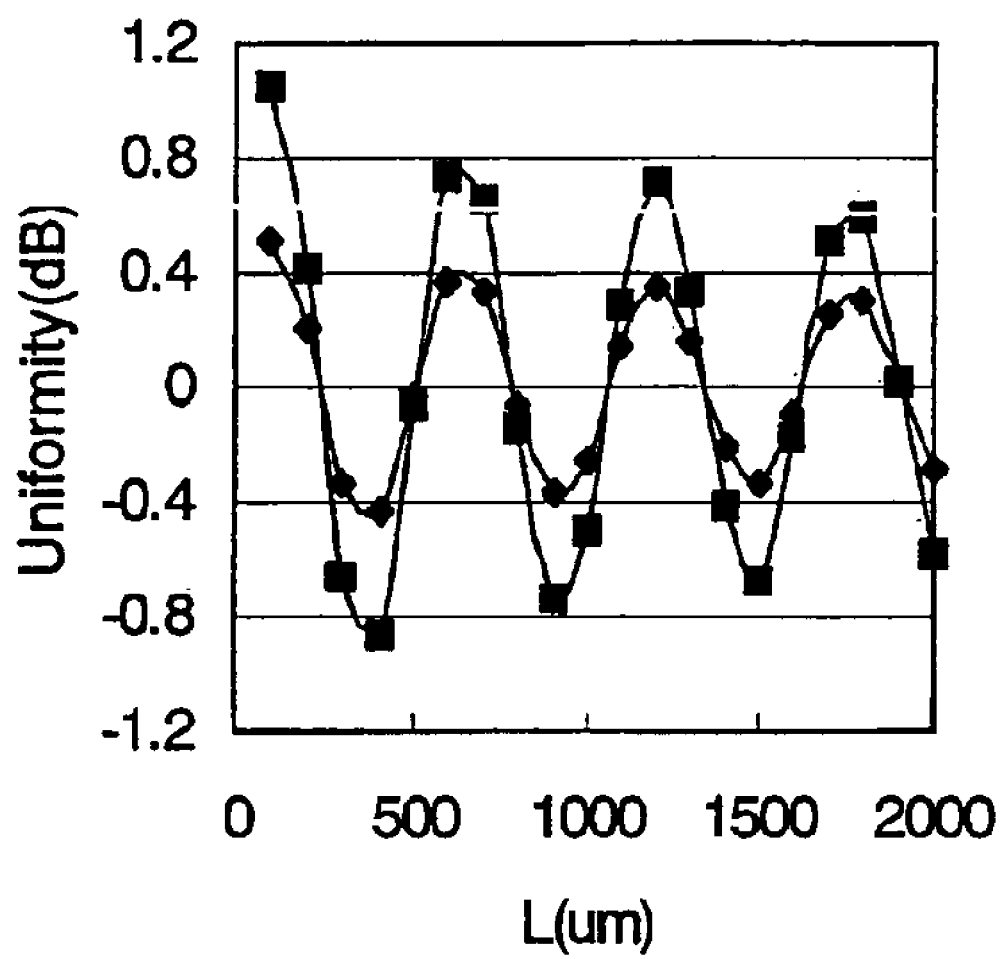
FIG. 4 shows a relation between a linear optical waveguide length L and a branching ratio characteristic.

The calculation of a loss between the input and output ports (output light power/input light power) was made by the BPM (beam propagation method). In order to calculate the influence of leaky light, an initial excitation light distribution was made to have a Gaussian shape, and an offset (◆0.2 $\mu$m, ■0.4 $\mu$m) was given to the center axis of the optical waveguide to intentionally generate a mode mismatching loss. With respect to the branching characteristic, a difference between output light powers from both of the branching optical waveguides was made uniformity, and the change of the uniformity was obtained while the optical waveguide length L of the linear incident optical waveguide 4 was changed. FIG. 4 shows the relation between the optical waveguide length L of the incident optical waveguide 4 and the branching ratio characteristic. In FIG. 4, the horizontal axis indicates the optical waveguide length L ($\mu$m) of the incident optical waveguide 4, and the vertical axis indicates the uniformity (dB).

The meander period estimated from the optical waveguide parameters is $\Lambda = 549\ \mu$m with $n_{clad} = 1.4473$, $n_{eff0} = 1.4501$, and $\lambda = 1.55\ \mu$m, and as shown in FIG. 4, when the optical waveguide length L of the input optical waveguide 4 from the light input end face $S_1$ of the input optical waveguide 4 to the light output end face $S_2$ of the input optical waveguide 4 to which the light input end face of the tapered optical waveguide 5 is connected is integer times as $550/2 = 275\ \mu$m, an excellent branching characteristic can be obtained.

Incidentally, a net coupling loss (ratio of the sum total of optical powers from plural branching outputs to input power) is about 0.01 dB until the magnitude of the offset is about 0.4 $\mu$m. This value corresponds to a range recognized as a coupling optimum point (loss becomes the lowest) in a process of optical axis alignment in the case where for example, an optical fiber is connected to the input optical waveguide 4. Accordingly, in the case where the optical branching device of this embodiment is applied to an actual device, the branching device must be fabricated so that deterioration of the uniformity falls within a range where a practical problem does not arise under a coupling state in which an offset of about 0.4 $\mu$m can occur. When a permissible amount of uniformity deterioration is ±0.3 dB, it is sufficient if fabrication is carried out within a deviation of ±20 to 30 $\mu$m, that is, about 10% of 275 $\mu$m.

As described above, according to the invention, it is possible to realize the optical branching device in which the optical axis alignment is easy and the lowering of yield is suppressed.

What is claimed is:

1. An optical branching device, comprising:
   an input optical waveguide for outputting light inputted from a light input end face to a light output end face;
   a tapered optical waveguide having a tapered part and one end face connected to the light output end face; and
   branching optical waveguides connected to the other end face of the tapered optical waveguide at a predetermined branching angle;

wherein when a propagation constant of a leaky mode is $\beta_L$, a propagation constant of a fundamental mode is $\beta_0$, a meander period is $\Lambda$, then $\Lambda=2\pi/(\beta_0-\beta_L)$, an optical waveguide length from a position which becomes a cause of occurrence of the leaky mode to the light output end face is substantially integer times as $\Lambda/2$.

2. An optical branching device according to claim 1, wherein the optical waveguide length is integer times as $\Lambda/2\pm10\%$ of $\Lambda/2$.

3. An optical branching device according to claim 1, wherein the position which becomes the cause of the occurrence of the leaky mode is in a vicinity of the light input end face.

4. An optical branching device according to claim 2, wherein the position which becomes the cause of the occurrence of the leaky mode is in a vicinity of the light input end face.

5. An optical branching device according to claim 3, wherein the light input end face is connected with a light output end face of an optical fiber.

6. An optical branching device according to claim 4, wherein the light input end face is connected with a light output end face of an optical fiber.

7. An optical branching device according to claim 1, wherein the position which becomes the cause of the occurrence of the leaky mode is a waveguide device or another optical branching device provided at a front stage of the input optical waveguide.

8. An optical branching device according to claim 2, wherein the position which becomes the cause of the occurrence of the leaky mode is a waveguide device or another optical branching device provided at a front stage of the input optical waveguide.

9. An optical branching device according to claim 1, wherein the input optical waveguide is formed to be linear.

10. An optical branching device according to claim 2, wherein the input optical waveguide is formed to be linear.

11. An optical branching device according to claim 3, wherein the input optical waveguide is formed to be linear.

12. An optical branching device according to claim 4, wherein the input optical waveguide is formed to be linear.

13. An optical branching device according to claim 5, wherein the input optical waveguide is formed to be linear.

14. An optical branching device according to claim 6, wherein the input optical waveguide is formed to be linear.

15. An optical branching device according to claim 7, wherein the input optical waveguide is formed to be linear.

16. An optical branching device according to claim 8, wherein the input optical waveguide is formed to be linear.

* * * * *